(12) United States Patent
Nanbu et al.

(10) Patent No.: US 11,738,657 B2
(45) Date of Patent: Aug. 29, 2023

(54) VEHICLE

(71) Applicant: SUBARU CORPORATION, Tokyo (JP)

(72) Inventors: Kohei Nanbu, Tokyo (JP); Kazuki Furuta, Tokyo (JP); Kenta Uwai, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 166 days.

(21) Appl. No.: 17/220,262

(22) Filed: Apr. 1, 2021

(65) Prior Publication Data

US 2021/0309118 A1 Oct. 7, 2021

(30) Foreign Application Priority Data

Apr. 2, 2020 (JP) .................. 2020-066612

(51) Int. Cl.
*B60L 53/62* (2019.01)
*B60L 53/65* (2019.01)

(52) U.S. Cl.
CPC .............. *B60L 53/62* (2019.02); *B60L 53/65* (2019.02); *B60L 2240/545* (2013.01)

(58) Field of Classification Search
CPC .... B60L 53/62; B60L 53/65; B60L 2240/545; B60L 58/12; B60L 2240/662; B60L 53/22; B60L 2240/36; B60L 2240/80; B60L 2260/46; B60L 2260/56; B60L 2260/58; Y02T 10/70; Y02T 10/7072; Y02T 10/72; Y02T 90/12; Y02T 90/14; Y02T 90/16

USPC .......................................... 320/104
See application file for complete search history.

(56) References Cited

U.S. PATENT DOCUMENTS 11,447,037 B2 * 9/2022 Klose ..................... B60L 53/62

FOREIGN PATENT DOCUMENTS

JP 2013-207927 A 10/2013

* cited by examiner

*Primary Examiner* — Paul Dinh
(74) *Attorney, Agent, or Firm* — McDermott Will & Emery LLP

(57) ABSTRACT

A vehicle includes an electric-device temperature acquisition unit, a charging controller, and a predicted charging time deriving unit. The electric-device temperature acquisition unit acquires a temperature of an electric device disposed in a current path for external charging for supplying electric power from a power supply external to the vehicle to a battery mounted in the vehicle. The charging controller pauses a supply of electric power to the battery in response to the temperature of the electric device becoming greater than or equal to a first threshold during the external charging, and resumes the supply of electric power to the battery in response to the temperature of the electric device becoming less than a second threshold lower than the first threshold. The predicted charging time deriving unit derives a predicted charging time predicted to be taken for the external charging in accordance with an instruction for the external charging.

4 Claims, 7 Drawing Sheets

VEHICLE

CROSS-REFERENCE TO RELATED APPLICATIONS

The present application claims priority from Japanese Patent Application No. 2020-066612 filed on Apr. 2, 2020, the entire contents of which are hereby incorporated by reference.

BACKGROUND

The disclosure relates to a vehicle that is externally chargeable.

In a vehicle such as an electric vehicle or a plug-in hybrid electric vehicle, a battery mounted in the vehicle is chargeable (externally chargeable) by a power supply external to the vehicle (for example, Japanese Unexamined Patent Application Publication No. 2013-207927).

SUMMARY

An aspect of the disclosure provides a vehicle including an electric-device temperature acquisition unit, a charging controller, and a predicted charging time deriving unit. The electric-device temperature acquisition unit is configured to acquire a temperature of an electric device disposed in a current path for external charging for supplying electric power from a power supply external to the vehicle to a battery mounted in the vehicle. The charging controller is configured to pause a supply of electric power to the battery in response to the temperature of the electric device becoming greater than or equal to a first threshold during the external charging, and resume the supply of electric power to the battery in response to the temperature of the electric device becoming less than a second threshold lower than the first threshold. The predicted charging time deriving unit is configured to derive a predicted charging time that is a time predicted to be taken for the external charging in accordance with an instruction for the external charging. The predicted charging time is a sum of a total supply time and a pause time. The total supply time is a total time during which electric power is supplied to the battery. The pause time is a period of time from when the supply of electric power to the battery is paused to when the supply of electric power to the battery is resumed.

An aspect of the disclosure provides a vehicle including an electric-device temperature acquisition unit and a predicted charging time deriving unit. The electric-device temperature acquisition unit is configured to acquire a temperature of an electric device disposed in a current path for external charging for supplying electric power from a power supply external to the vehicle to a battery mounted in the vehicle. The predicted charging time deriving unit is configured to derive a predicted charging time that is a time predicted to be taken for the external charging in accordance with an instruction for the external charging. When an expected temperature of the electric device at a time of completion of the external charging is predicted to be greater than or equal to a travel-preparation threshold, the predicted charging time deriving unit is configured to derive a travel-preparation time and extends the predicted charging time by the travel-preparation time. The travel-preparation time is a period of time from the time of completion of the external charging until the temperature of the electric device becomes less than the travel-preparation threshold.

An aspect of the disclosure provides a vehicle including circuitry. The circuitry is configured to acquire a temperature of an electric device disposed in a current path for external charging for supplying electric power from a power supply external to the vehicle to a battery mounted in the vehicle. The circuitry is configured to pause a supply of electric power to the battery in response to the temperature of the electric device becoming greater than or equal to a first threshold during the external charging, and resume the supply of electric power to the battery in response to the temperature of the electric device becoming less than a second threshold lower than the first threshold. The circuitry is configured to derive a predicted charging time that is a time predicted to be taken for the external charging in accordance with an instruction for the external charging. The predicted charging time is a sum of a total supply time and a pause time. The total supply time is a total time during which electric power is supplied to the battery. The pause time is a period of time from when the supply of electric power to the battery is paused to when the supply of electric power to the battery is resumed.

An aspect of the disclosure provides a vehicle including circuitry. The circuitry is configured to acquire a temperature of an electric device disposed in a current path for external charging for supplying electric power from a power supply external to the vehicle to a battery mounted in the vehicle. The circuitry is configured to derive a predicted charging time that is a time predicted to be taken for the external charging in accordance with an instruction for the external charging. When an expected temperature of the electric device at a time of completion of the external charging is predicted to be greater than or equal to a travel-preparation threshold, the circuitry is configured to derive a travel-preparation time and extend the predicted charging time by the travel-preparation time. The travel-preparation time is a period of time from the time of completion of the external charging until the temperature of the electric device becomes less than the travel-preparation threshold.

BRIEF DESCRIPTION OF THE DRAWINGS

The accompanying drawings are included to provide a further understanding of the disclosure and are incorporated in and constitute a part of this specification. The drawings illustrate an embodiment and, together with the specification, serve to explain the principles of the disclosure.

DETAILED DESCRIPTION

A vehicle that is externally chargeable includes various electric devices, such as a relay, in a current path between a charging port and a battery. During external charging, current flows through the electric devices, and the temperature of the electric devices increases. If the temperature of the electric devices becomes greater than or equal to a predetermined threshold during external charging, the external charging may be temporarily paused to prevent the increase in the temperature of the electric devices.

Prior to the start of the external charging, the charging time is predicted. If the external charging is temporarily paused while the external charging is ongoing, a difference may occur between the predicted charging time and the actual charging time.

It is therefore desirable to provide a vehicle with improved prediction accuracy of the charging time.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

Figure 1:
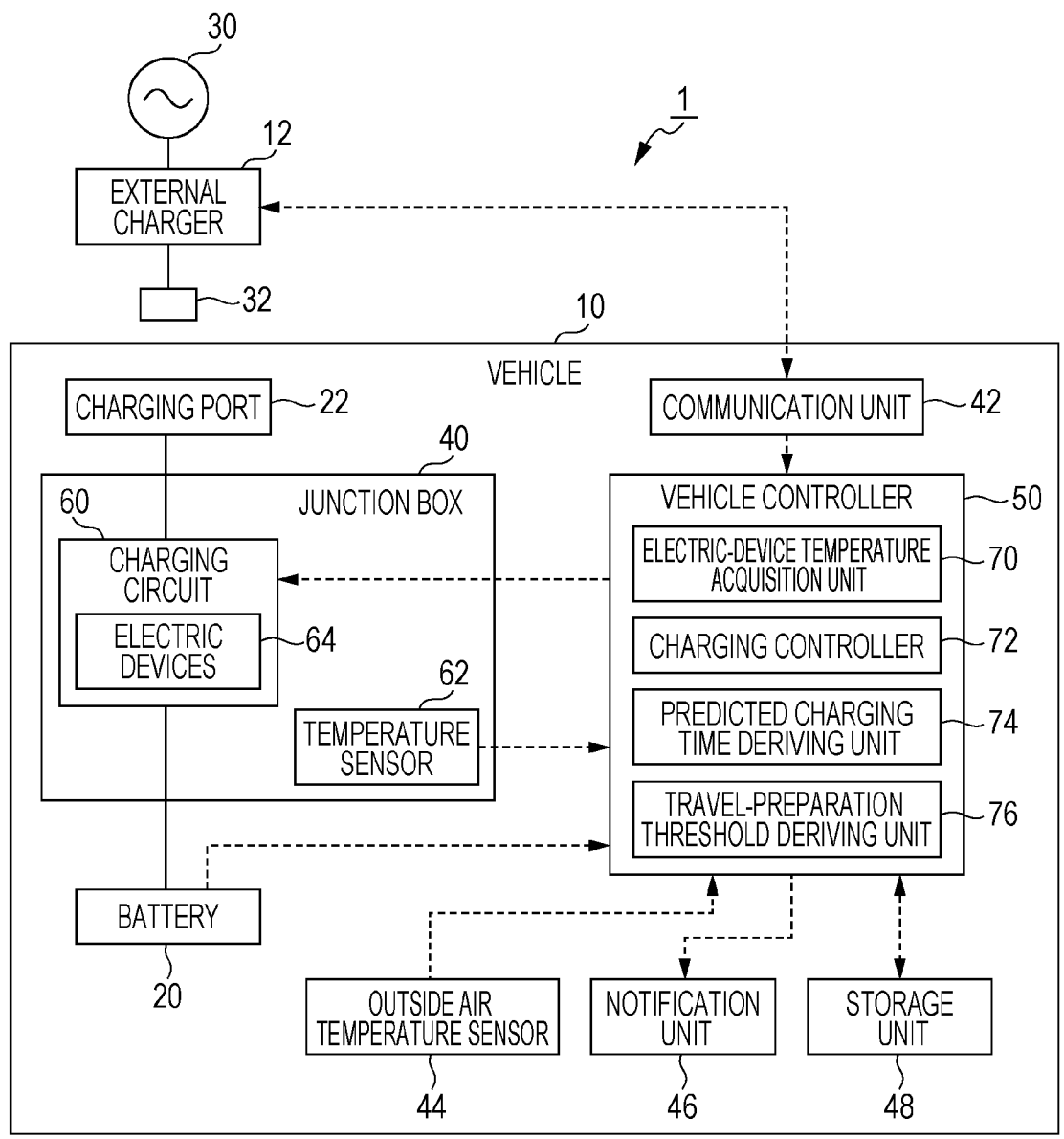
FIG. 1 is a schematic diagram illustrating a configuration of a charging system according to an embodiment of the disclosure.

FIG. 1 is a schematic diagram illustrating a configuration of a charging system 1 according to this embodiment. The charging system 1 includes a vehicle 10 and an external charger 12.

Examples of the vehicle 10 include an electric vehicle and a plug-in hybrid electric vehicle. The vehicle 10 includes a battery 20 to supply electric power to a motor (not illustrated), which is a drive source. The battery 20 is, for example, a secondary battery such as a lithium-ion battery. The vehicle 10 also includes a charging port 22 to be coupled to the battery 20. The charging port 22 is disposed in, for example, a side surface of the body of the vehicle 10.

The external charger 12 is coupled to, for example, a power supply 30 (external power supply) external to the vehicle 10. Examples of the power supply 30 include a power generation facility of a power company. The external charger 12 has a charging connector 32 connectable to the charging port 22 of the vehicle 10. The external charger 12 is capable of converting electric power supplied from the power supply 30 and supplying the converted electric power to the battery 20 via the charging connector 32 and the charging port 22. That is, the battery 20 mounted in the vehicle 10 is chargeable (externally chargeable) by the external charger 12.

The vehicle 10 includes, in addition to the battery 20 and the charging port 22, a junction box 40, a communication unit 42, an outside air temperature sensor 44, a notification unit 46, a storage unit 48, and a vehicle controller 50.

The junction box 40 is a hollow box. The junction box 40 accommodates a charging circuit 60 and a temperature sensor 62. The charging circuit 60 is coupled to the charging port 22 and the battery 20. The charging circuit 60 forms a current path between the charging port 22 and the battery 20. The charging circuit 60 is capable of guiding current flowing into the charging port 22 to the battery 20. The charging circuit 60 is also capable of blocking current flow from the charging port 22 to the battery 20 by using, for example, a relay, a contactor, or the like.

The charging circuit 60 is constituted by various electric devices 64. That is, the electric devices 64 are disposed in the current path (current path for external charging) between the charging port 22 and the battery 20. The electric devices 64 include, for example, a relay, a contactor, and a busbar. The electric devices 64 are not limited to the exemplified components and may be components constituting the charging circuit 60. The temperature sensor 62 detects the temperature of a space in the junction box 40.

The communication unit 42 is capable of establishing communication with devices outside the vehicle 10, for example, the external charger 12. The outside air temperature sensor 44 detects the outside air temperature around the vehicle 10.

In the vehicle 10, as described in detail below, the charging time for external charging is predicted before the external charging is started. The notification unit 46 provides a notification of the predicted charging time. The notification unit 46 provides a notification of the predicted charging time by using, for example, a display of a console or the like. The storage unit 48 is a non-volatile memory such as a hard disk drive. The storage unit 48 stores various kinds of information to be used by the vehicle controller 50.

The vehicle controller 50 is constituted by a semiconductor integrated circuit including a central processing unit (CPU), a read-only memory (ROM) storing a program and the like, a random access memory (RAM) serving as a work area, and so on. Although not described in detail herein, the vehicle controller 50 controls the components of the vehicle 10, such as a driving mechanism, a braking mechanism, and a steering mechanism (not illustrated).

Further, the vehicle controller 50 executes a program to also function as an electric-device temperature acquisition unit 70, a charging controller 72, a predicted charging time deriving unit 74, and a travel-preparation threshold deriving unit 76.

The electric-device temperature acquisition unit 70 acquires the temperature of the electric devices 64. The temperature of the electric devices 64 is hereinafter sometimes referred to as the electric-device temperature. For example, the storage unit 48 stores in advance a conversion table indicating correlations between the temperature of the space in the junction box 40 and the electric-device temperature. The electric-device temperature acquisition unit 70 acquires the temperature of the space in the junction box 40 from the temperature sensor 62 and converts the temperature into the electric-device temperature using the conversion table.

The electric-device temperature acquisition unit 70 may not necessarily acquire the electric-device temperature using the detection result of the temperature sensor 62 described above. For example, the electric-device temperature acquisition unit 70 may estimate the electric-device temperature from the voltage applied to the electric devices 64, the terminal voltage of the battery 20, or the like.

The charging controller 72 controls the external charging of the battery 20. For example, the charging controller 72 controls the turning on and off of the relay, the contactor, or the like, which is an example of the electric devices 64 in the charging circuit 60, to supply electric power to the battery 20, stop the supply of electric power, and resume the supply of electric power.

Figure 2A:
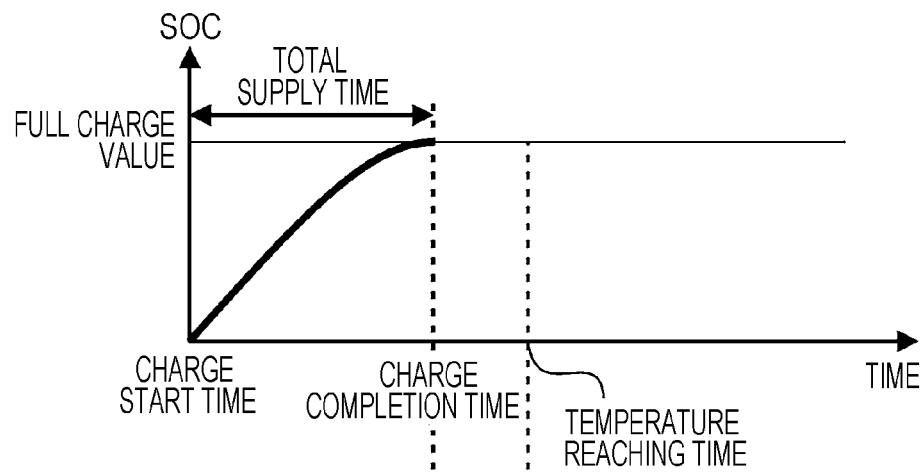
FIGS. 2A and 2B are diagrams illustrating an example of the state of charge (SOC) and electric-device temperature of a battery during external charging.
Figure 2B:
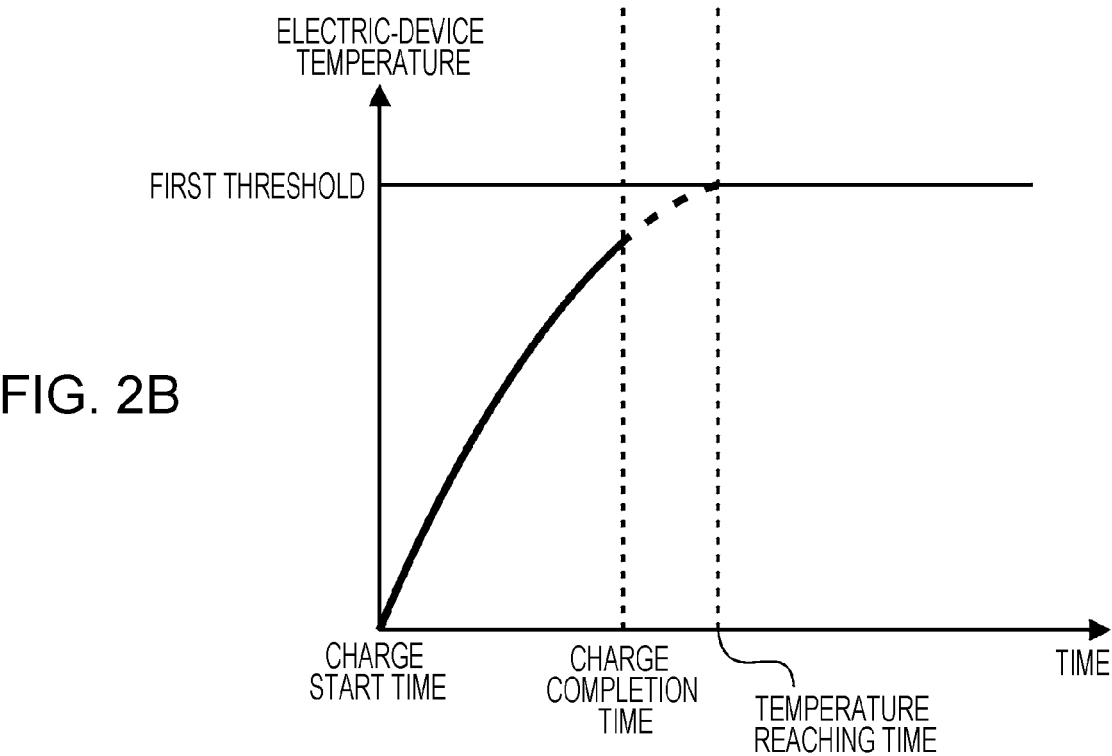

FIGS. 2A and 2B are diagrams illustrating an example of the state of charge (SOC) and electric-device temperature of the battery 20 during external charging. As illustrated in FIG. 2A, the charging controller 72 continuously charges the battery 20 for a period from, for example, the point in time at which the charging is started ("charge start time") to when the SOC of the battery 20 becomes a value indicating a fully charged battery ("full charge value"). That is, the point in time at which the charging is completed ("charge completion time") is set to the point in time at which the SOC reaches the full charge value.

As illustrated in FIG. 2B, a first threshold is set in advance for the electric-device temperature. The first threshold is set to protect the electric devices 64. The first threshold is set to be less than or equal to a temperature allowable for the electric devices 64. The charging controller 72 is allowed to supply electric power to the battery 20 for a period from the charge start time to the point in time at which the electric-device temperature reaches the first threshold ("temperature reaching time").

As illustrated in FIGS. 2A and 2B, the charging can be completed for the period from the charge start time to the temperature reaching time. In FIG. 2B, a broken line in a period from the charge completion time to the temperature reaching time indicates an example of the electric-device temperature that is assumed to increase even after the charging is completed.

When the charging is completed before the electric-device temperature reaches the first threshold, the charging controller 72 can continuously supply electric power to the battery 20 for a period from the charge start time to the charge completion time. Hereinafter, the time (total time) during which electric power is supplied to the battery 20 during external charging is sometimes referred to as the total supply time. When electric power is supplied in consecutive periods with a pause time described below interposed therebetween, the total supply time represents the total time obtained by summing up the time during which electric power is supplied before the pause time and the time during which electric power is supplied after the pause time.

The predicted charging time deriving unit 74 derives a predicted charging time, which is the time predicted to be taken for external charging, before the start of external charging. In the example illustrated in FIGS. 2A and 2B, electric power is continuously supplied to the battery 20 until the charge completion time. Thus, the predicted charging time deriving unit 74 can derive a predicted charging time that is substantially equal to the actual charging time.

Figure 3A:
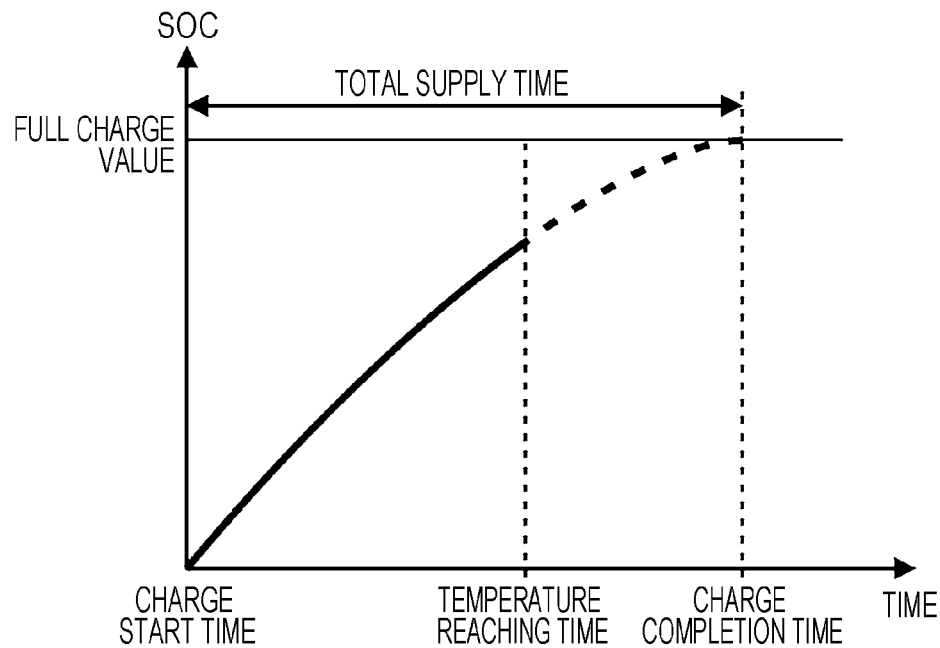
FIGS. 3A and 3B are diagrams illustrating another example of the SOC and electric-device temperature of the battery during external charging.
Figure 3B:
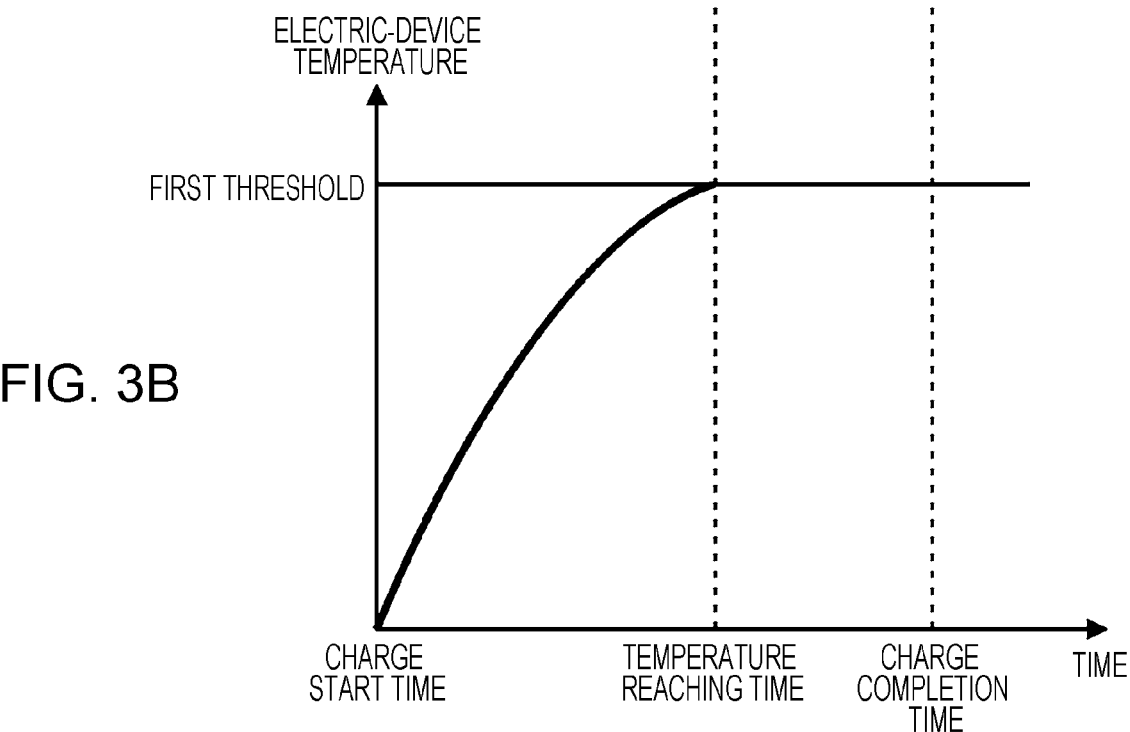

FIGS. 3A and 3B are diagrams illustrating another example of the SOC and electric-device temperature of the battery 20 during external charging. In the example illustrated in FIGS. 3A and 3B, the electric-device temperature reaches the first threshold in a period from the charge start time to the charge completion time. In FIG. 3A, a broken line in a period from the temperature reaching time to the charge completion time indicates an example of the electric-device temperature obtained assuming that the charging continues even after the electric-device temperature reaches the first threshold.

When the electric-device temperature reaches the first threshold before the charging is completed, the charging controller 72 temporarily pauses the supply of electric power to the battery 20 to prevent the electric-device temperature from excessively increasing to protect the electric devices 64.

When the supply of electric power to the battery 20 is paused, the actual charge completion time is delayed with respect to the initial charge completion time, which is predicted at the charge start time. As a result, a difference occurs between the predicted charging time, which is predicted before the charging is started, and the actual charging time.

To address this, when predicting the charging time, the predicted charging time deriving unit 74 also predicts the pause time during which the supply of electric power to the battery 20 is temporarily paused, and derives the predicted charging time taking the predicted pause time into account. The derivation of the predicted charging time will be described in detail hereinafter.

Figure 4A:
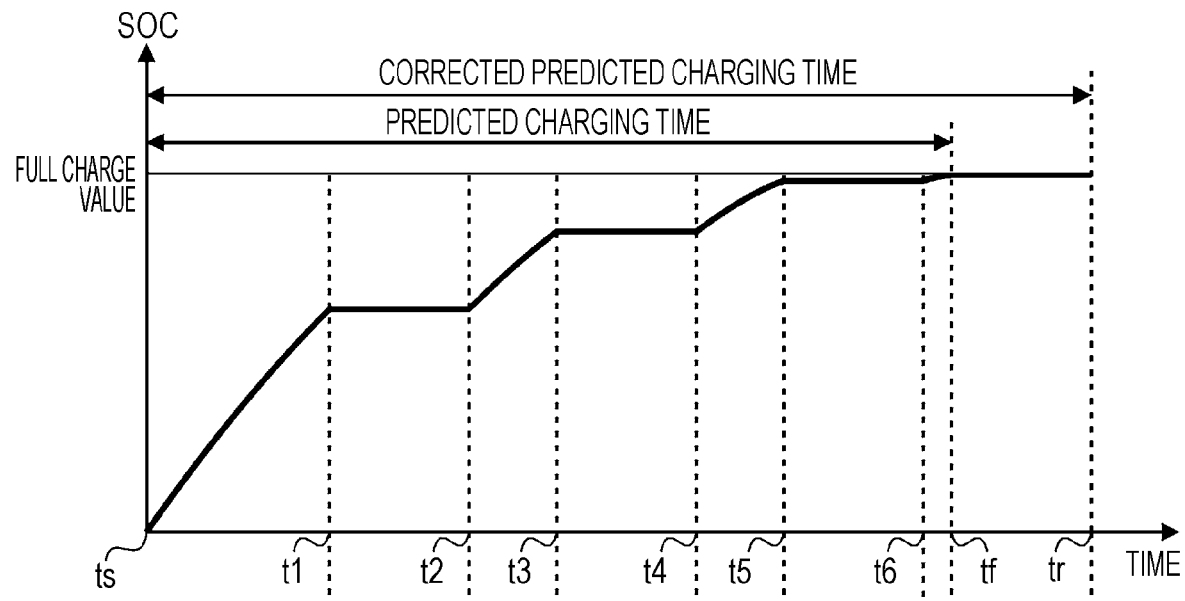
FIGS. 4A and 4B are diagrams describing a predicted charging time.
Figure 4B:
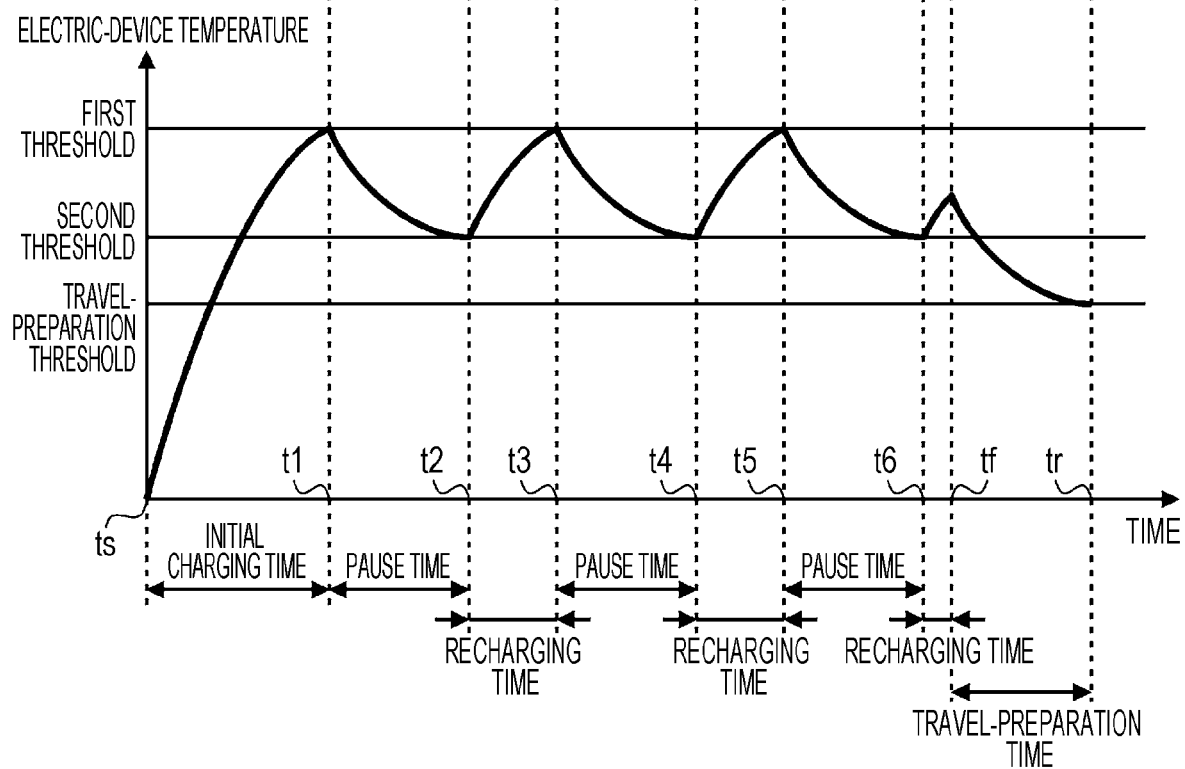

FIGS. 4A and 4B are diagrams describing the predicted charging time. FIG. 4A illustrates an example change in SOC during external charging. FIG. 4B illustrates an example change in electric-device temperature during external charging. The specific changes are not limited to the illustrated ones and may be different depending on the SOC, the electric-device temperature, the outside air temperature, or the like at the charge start time.

When the charging is started (ts), the charging controller 72 causes the charging circuit 60 to supply electric power from the external charger 12 to the battery 20. At this time, the battery 20 is supplied with electric power according to allowed input current. The allowed input current is current that can be input from the external charger 12 to the battery 20. Accordingly, as illustrated in FIG. 4A, the SOC of the battery 20 increases with time after the charge start time (ts).

When the charging is started, current flows through the electric devices 64, and the electric devices 64 generate heat in response to current flow. Since the amount of generated heat is larger than the amount of heat dissipated by the outside air temperature, as illustrated in FIG. 4B, the electric-device temperature increases with time after the charge start time (ts).

For example, as illustrated in FIG. 4B, the electric-device temperature is assumed to reach the first threshold at a first time (t1) between the charge start time (ts) and the charge completion time (tf). When the electric-device temperature becomes greater than or equal to the first threshold, the charging controller 72 temporarily pauses the supply of electric power to the battery 20. In one embodiment, the charging controller 72 causes the relay or the like of the charging circuit 60 to turn off to block the current flow into the battery 20.

When the supply of electric power is paused, as illustrated in FIG. 4A, the SOC of the battery 20 does not increase and is maintained substantially at the value obtained at the point in time when the supply of electric power is paused. Since no current flows, the electric devices 64 do not generate heat, and heat is dissipated by the outside air temperature. Thus, as illustrated in FIG. 4B, the electric-device temperature gradually decreases from the first threshold.

As illustrated in FIG. 4B, a second threshold is set in advance for the electric-device temperature. The second threshold is set to a value smaller than the first threshold. The second threshold is a criterion for resuming the charging.

It is assumed that the electric-device temperature is reduced to a value less than the second threshold at a second time (t2) between the first time (t1) and the charge completion time (tf). If the electric-device temperature becomes less than the second threshold while the supply of electric power is paused, the charging controller 72 resumes the supply of electric power to the battery 20. In one example, the charging controller 72 causes the relay or the like of the charging circuit 60 to turn on to cause current to flow into the battery 20.

When the supply of electric power is resumed, as illustrated in FIG. 4A, the SOC of the battery 20 increases again from the maintained value. Since current flows again, the amount of heat generated by the electric devices 64 is larger than the amount of dissipated heat. Thus, as illustrated in FIG. 4B, the electric-device temperature increases again from the second threshold.

The charging controller 72 repeatedly performs, until the SOC reaches the full charge value, the operation of pausing the supply of electric power again when the electric-device temperature reaches the first threshold again, and resuming the supply of electric power when the electric-device temperature falls below the second threshold again while the supply of electric power is paused.

In the example illustrated in FIGS. 4A and 4B, the supply of electric power is paused at a third time (t3), the supply of electric power is resumed at a fourth time (t4), the supply of electric power is paused at a fifth time (t5), and the supply of electric power is resumed at a sixth time (t6) before the charge completion time (tf) is reached. That is, in the illustrated example, pausing and resuming are each repeated three times. The number of times pausing is repeated and the number of times resuming is repeated may depend on the SOC, the electric-device temperature, the outside air temperature, or the like at the charge start time.

The period of time from the charge start time (ts) to the first time (t1) at which the electric-device temperature reaches the first threshold for the first time after the charging is started is sometimes referred to as the initial charging time. The period of time from when the supply of electric power to the battery 20 is paused to when the supply of electric power to the battery 20 is resumed (for example, the period of time between the first time (t1) and the second time (t2), the period of time between the third time (t3) and the fourth time (t4), and the period of time between the fifth time (t5) and the sixth time (t6)) is sometimes referred to as the pause time. The total of all the pause times (for example, (t1 to t2)+(t3 to t4)+(t5 to t6)) is sometimes referred to as the total pause time.

Further, the period of time from when the supply of electric power to the battery 20 is resumed to when the supply of electric power to the battery 20 is paused or to when the charging is completed (for example, the period of time between the second time (t2) and the third time (t3), the period of time between the fourth time (t4) and the fifth time (t5), and the period of time between the sixth time (t6) and the charge completion time (tf)) is sometimes referred to as the recharging time. The total of all the recharging times (for example, (t2 to t3)+(t4 to t5)+(t6 to tf)) is sometimes referred to as the total recharging time. The total supply time during which electric power is supplied to the battery 20 (see FIGS. 2A and 2B or FIGS. 3A and 3B) corresponds to the time obtained by adding the initial charging time and the total recharging time together (initial charging time+total recharging time).

The predicted charging time deriving unit 74 derives the sum of the initial charging time, the total recharging time, and the total pause time (initial charging time+total recharging time+total pause time) as a predicted charging time. In other words, the predicted charging time deriving unit 74 derives the sum of the total supply time and the total pause time (total supply time+total pause time) as a predicted charging time.

If the supply of electric power is paused before the charging is completed, recharging is performed to complete charging. Accordingly, the number of times the supply of electric power is paused (the number of pauses) and the number of times the supply of electric power is resumed (the number of recharges) are identical. As a result, the number of recharges may be regarded as the number of pauses.

Since the first threshold and the second threshold are set in advance for the pause time, the pause time can be derived based on the outside air temperature. Assuming here that the outside air temperature is constant during external charging, the amounts of heat dissipated during the respective pause times are the same, and the lengths of the respective pause times are equal. As a result, the total pause can be derived by multiplying the number of pauses (the number of recharges) by the pause time.

The predicted charging time deriving unit 74 derives the total pause time before the start of external charging, and adds the total pause time to the total supply time to derive the predicted charging time. Since the total pause time is reflected in the predicted charging time, the predicted charging time can be prevented from deviating from the actual charging time even if external charging is temporarily interrupted later while the external charging is ongoing.

In one example, the initial charging time, the pause time, and the recharging time (i.e., the time taken to change the electric-device temperature) can be derived using Equation (1) below. In Equation (1), $\Delta T$ denotes the temperature difference between before and after the change in electric-device temperature, I denotes the allowed input current, R denotes the internal resistance of the electric devices 64, t denotes the time taken to change the electric-device temperature, C denotes the thermal capacity of the electric devices 64, $\alpha$ denotes the heat dissipation coefficient, Tb denotes the current electric-device temperature, and To denotes the current outside air temperature. The first term of the right-hand side of Equation (1) represents heat generation, and the second term of the right-hand side of Equation (1) represents heat dissipation.

$$\Delta T = (I^2 R \times t / C) - \alpha(Tb - To) \tag{1}$$

The electric devices 64 in the junction box 40 include a component through which current supplied to the motor flows while the vehicle 10 travels. This may cause an increase in the electric-device temperature even while the vehicle 10 travels.

In addition, some drivers may start driving the vehicle 10 immediately after the completion of external charging. If driving of the vehicle 10 is started immediately in a state where the electric-device temperature at the charge completion time is relatively high, in some cases, the electric-device temperature may reach the first threshold during the traveling of the vehicle 10. If the electric-device temperature reaches the first threshold during the traveling of the vehicle 10, for example, the vehicle controller 50 limits the acceleration or the like of the vehicle 10 to protect the electric devices 64. This may prevent the driver from driving the vehicle 10 as desired.

Accordingly, when the electric-device temperature at the charge completion time is greater than or equal to a travel-preparation threshold, the charging controller 72 waits for a period from the charge completion time to when the electric-device temperature becomes less than the travel-preparation threshold although the actual charging is completed. The travel-preparation threshold will be described in detail below. At the point in time when the electric-device temperature becomes less than the travel-preparation threshold, the charging controller 72 issues a notification that the external charging has been completed, and permits the vehicle 10 to travel.

The charging controller 72 may limit the start of traveling when the electric-device temperature at the charge completion time is greater than or equal to the travel-preparation threshold, and may cancel the limitation of the start of traveling at the point in time when the electric-device temperature becomes less than the travel-preparation threshold.

This may increase the time taken until the electric-device temperature reaches the first threshold, and prevent the electric-device temperature from reaching the first threshold during the traveling of the vehicle 10. As a result, the driver is able to drive the vehicle 10 as desired even when the driver drives the vehicle 10 immediately after the vehicle 10 is permitted to travel.

In the example illustrated in FIG. 4B, the travel-preparation threshold is set to a value smaller than the second threshold. In the illustrated example, the electric-device temperature at the charge completion time (tf) is greater than or equal to the travel-preparation threshold. Hereinafter, the electric-device temperature at the charge completion time is sometimes referred to as the completion-time temperature. When the external charging is completed, current for the external charging no longer flows through the electric device 64. Thus, as illustrated in FIG. 4B, the electric-device temperature decreases from the completion-time temperature due to heat dissipation by the outside air temperature.

It is assumed that the electric-device temperature becomes less than the travel-preparation threshold after the charge completion time (tf). Hereinafter, the point in time at which the electric-device temperature becomes less than the travel-preparation threshold after the charge completion time is sometimes referred to as the travel permission time (tr). The period of time from the charge completion time to the travel permission time is sometimes referred to as the travel-preparation time.

When deriving the predicted charging time, the predicted charging time deriving unit 74 predicts an expected electric-device temperature at the charge completion time (completion-time temperature). For example, the predicted charging time deriving unit 74 derives the last recharging time (for example, t6 to tf) on the basis of the total supply time, the initial charging time, and the recharging times between the pause times. The predicted charging time deriving unit 74 derives the amount of increase in the electric-device temperature during the last recharging time on the basis of the last recharging time, the allowed input current, and the outside air temperature. The predicted charging time deriving unit 74 adds the amount of increase in the electric-device temperature during the last recharging time to the second threshold to derive the completion-time temperature.

If the completion-time temperature is predicted to be greater than or equal to the travel-preparation threshold, the predicted charging time deriving unit 74 derives the travel-preparation time. For example, the predicted charging time deriving unit 74 derives the travel-preparation time on the basis of the temperature difference between the completion-time temperature and the travel-preparation threshold and the outside air temperature.

The predicted charging time deriving unit 74 adds the predicted charging time until the charge completion time and the travel-preparation time together to update (correct) the predicted charging time. That is, the predicted charging time deriving unit 74 extends the predicted charging time by the travel-preparation time.

As described above, extending the predicted charging time by the travel-preparation time prevents the predicted charging time from deviating from the time taken until the vehicle 10 is actually permitted to travel even if the vehicle 10 is permitted to travel after the electric-device temperature becomes less than the travel-preparation threshold after the completion of charging.

In the case of timer-based charging, the driver or the like typically sets the charge end time. The predicted charging time deriving unit 74 according to this embodiment receives an instruction for timer-based charging (instruction to perform timer-based charging). Upon receipt of the instruction, the predicted charging time deriving unit 74 derives a corrected predicted charging time.

The charging controller 72 according to this embodiment sets the travel permission time (tr) to a time before the set charge end time. The charging controller 72 sets the time earlier than the travel permission time (tr) by the corrected predicted charging time as the charge start time (ts). At the charge start time (ts), the charging controller 72 starts external charging.

As described above, the travel permission time (tr) is set to a time before the charge end time in the case of timer-based charging, and external charging is started on the basis of the corrected predicted charging time. This can prevent the electric-device temperature from becoming greater than or equal to the first threshold even if the driver immediately drives the vehicle 10 after the charge end time in the case of timer-based charging.

The larger the load is on the motor for driving the vehicle 10, the more likely it is that the electric-device temperature increases. For example, if a rapid acceleration operation is frequently performed during the traveling of the vehicle 10, the electric-device temperature is more likely to increase than when a slow acceleration operation is performed.

The travel-preparation threshold described above may be, for example, a constant value set in advance. If the travel-preparation threshold is fixed to a constant value, the electric-device temperature may reach the first threshold during the traveling of the vehicle 10 after the external charging is completed, depending on the operation of the driver. In this case, the acceleration or the like of the vehicle 10 may be limited, and the driver may not be able to drive the vehicle 10 as desired.

Accordingly, the travel-preparation threshold deriving unit 76 derives the travel-preparation threshold on the basis of the amount of increase in the electric-device temperature in the previous travel cycle. The travel cycle indicates a period from when the start key of the vehicle 10 is turned on to when the start key of the vehicle 10 is turned off.

For example, the electric-device temperature acquisition unit 70 sequentially acquires the electric-device temperature during the travel cycle and stores a change in the electric-device temperature in the storage unit 48. At the end of the travel cycle, the electric-device temperature acquisition unit 70 subtracts the minimum value of the electric-device temperature during the travel cycle from the maximum value of the electric-device temperature during the travel cycle to derive an amount of increase in the electric-device temperature during the current travel cycle, and stores the amount of increase in the storage unit 48. The amount of increase in the electric-device temperature during the travel cycle increases as, for example, the number of times the rapid acceleration operation is performed increases.

The travel-preparation threshold deriving unit 76 reads amounts of increase in the electric-device temperature during the most recent several travel cycles from the storage unit 48 and derives a typical value of the amounts of increase in the electric-device temperature. The typical value of the amounts of increase in the electric-device temperature is, for example, but not limited to, the maximum value of the read values. Alternatively, the typical value of the amounts of increase in the electric-device temperature may be the average value or the like of the read values.

The travel-preparation threshold deriving unit 76 subtracts the typical value of the amounts of increase in the electric-device temperature from the first threshold and sets the resulting value as a travel-preparation threshold. Accordingly, the travel-preparation threshold is set to a lower value as the rapid acceleration operation is performed more frequently in the most recent several travel cycles.

Figure 5A:
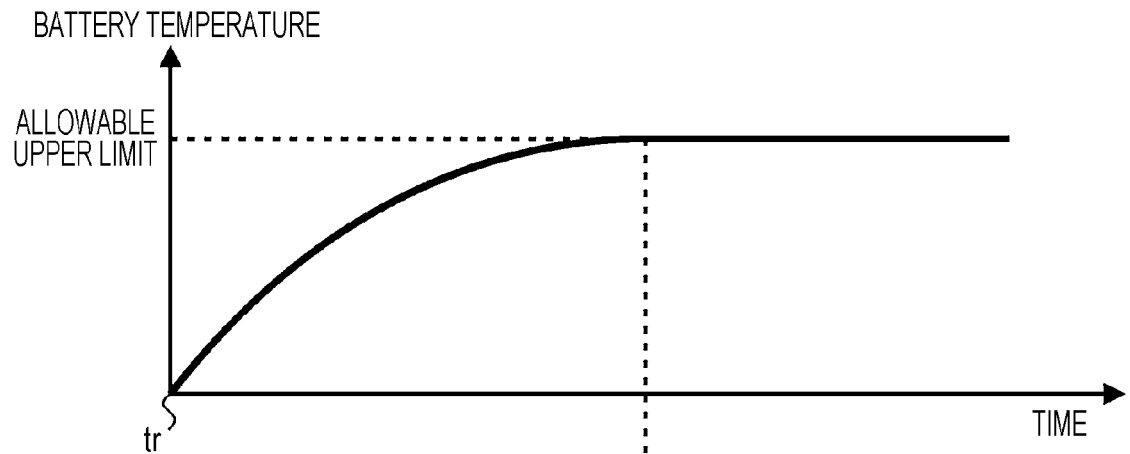
FIGS. 5A and 5B are diagrams describing effects of the derivation of a travel-preparation threshold.
Figure 5B:
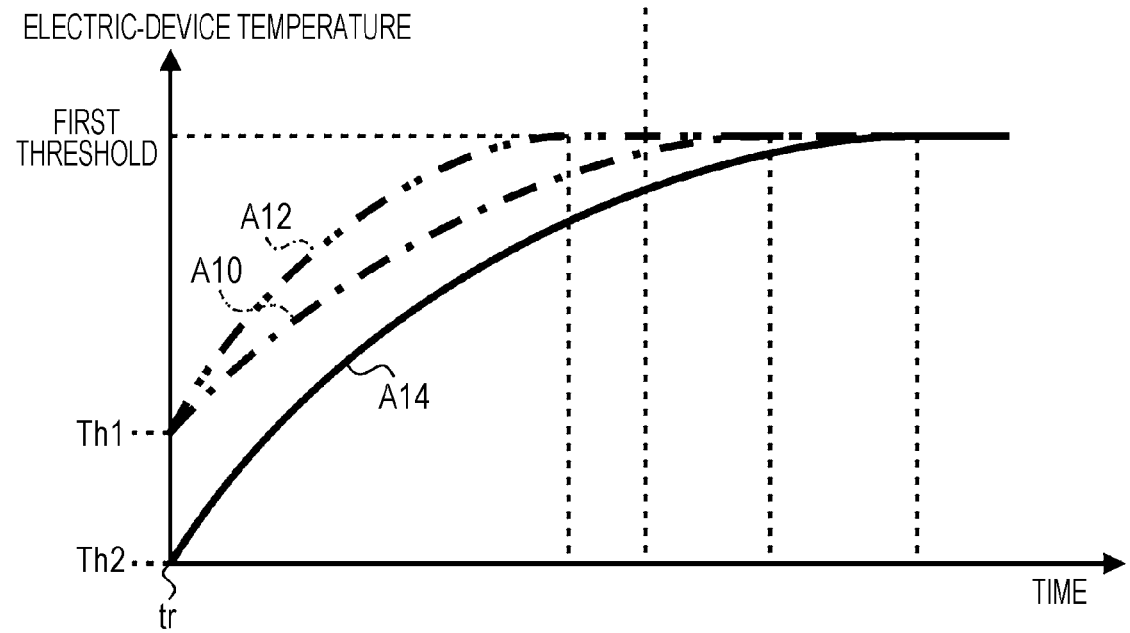

FIGS. 5A and 5B are diagrams describing effects of the derivation of the travel-preparation threshold. FIG. 5A illustrates an example change in battery temperature. FIG. 5B illustrates an example change in electric-device temperature. FIGS. 5A and 5B exemplarily illustrate a case where the vehicle 10 starts traveling immediately after the travel permission time (tr). In FIG. 5B, a one-dot chain line A10 indicates an example in which a slow acceleration operation is performed from a constant travel-preparation threshold (Th1). A two-dot chain line A12 indicates an example in which a rapid acceleration operation is performed from the constant travel-preparation threshold (Th1). A solid line A14 indicates an example in which a travel-preparation threshold (Th2) that is lower than the constant travel-preparation threshold (Th1) is derived in this embodiment, from which a rapid acceleration operation is performed.

As illustrated in FIG. 5A, the temperature (battery temperature) of the battery 20 increases as the vehicle 10 travels. The battery 20 can fully exert its performance until the battery temperature reaches the allowable upper limit.

As indicated by the one-dot chain line A10 in FIG. 5B, when a slow acceleration operation is performed, it takes a relatively long time for the electric-device temperature to reach the first threshold from the constant travel-preparation threshold (Th1). Thus, in the example indicated by the one-dot chain line A10, the battery temperature may reach the allowable upper limit before the electric-device temperature reaches the first threshold. In this case, the performance of the battery 20 can be fully exerted regardless of the electric-device temperature.

When a rapid acceleration operation is performed, however, as indicated by the two-dot chain line A12 in FIG. 5B, the time taken until the electric-device temperature reaches the first threshold from the constant travel-preparation threshold (Th1) is shorter than that indicated by the one-dot chain line A10. As a result, the electric-device temperature may reach the first threshold before the battery temperature reaches the allowable upper limit. In this case, while the electric devices 64 are protected, the acceleration of the vehicle 10 is limited due to the electric-device temperature although the performance of the battery 20 can be fully exerted.

As indicated by the solid line A14 in FIG. 5B, in contrast, setting the travel-preparation threshold Th2 to a low value makes it possible to increase the time taken until the electric-device temperature reaches the first threshold, compared with that as indicated by the two-dot chain line A12, even if a rapid acceleration operation is performed. As a result, the time taken until the electric-device temperature reaches the first threshold can be delayed with respect to the time taken until the battery temperature reaches the allowable upper limit. Accordingly, even if a rapid acceleration operation is performed, the performance of the battery 20 can be fully exerted regardless of the electric-device temperature.

Further, the travel-preparation threshold deriving unit 76 sets the travel-preparation threshold to a higher value as the amounts of increase in the electric-device temperature in the most recent several travel cycles decrease (as the number of times a slow acceleration operation is performed increases). This prevents the corrected predicted charging time from increasing more than necessary.

Figure 6:
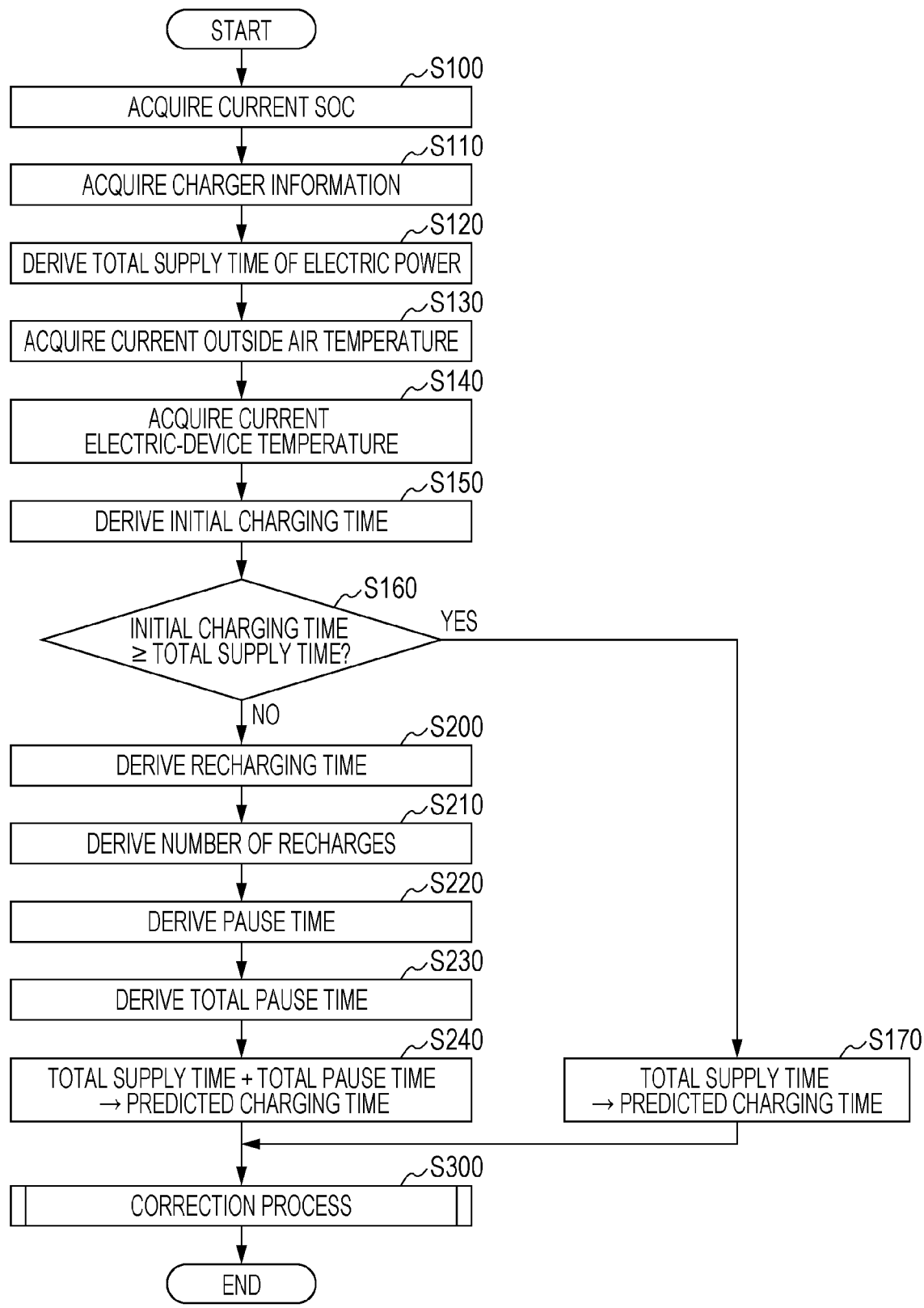
FIG. 6 is a flowchart illustrating a process for the derivation of the predicted charging time.

FIG. 6 is a flowchart illustrating a process for the derivation of the predicted charging time. The predicted charging time deriving unit 74 executes the series of processing operations illustrated in FIG. 6 upon receipt of an instruction for external charging in response to the charging connector 32 being coupled to the charging port 22.

First, the predicted charging time deriving unit 74 acquires the current SOC (S100). Then, the predicted charging time deriving unit 74 acquires charger information from the external charger 12 via the communication unit 42 (S110). The acquired charger information includes information on the allowed input current.

Then, the predicted charging time deriving unit 74 derives the total supply time of electric power for external charging on the basis of the current SOC and the allowed input current (S120). Here, the total supply time that does not take the electric-device temperature into account is derived.

Then, the predicted charging time deriving unit 74 acquires the current outside air temperature from the outside air temperature sensor 44 (S130). Then, the electric-device temperature acquisition unit 70 acquires the current electric-device temperature by referring to the temperature of the temperature sensor 62 (S140).

Then, the predicted charging time deriving unit 74 derives the initial charging time, which is taken until the electric-device temperature reaches the first threshold, on the basis of the allowed input current, the current outside air temperature, and the current electric-device temperature (S150). Then, the predicted charging time deriving unit 74 determines whether the initial charging time is greater than or equal to the total supply time (S160).

If the initial charging time is greater than or equal to the total supply time (YES in S160), the predicted charging time deriving unit 74 determines that no recharging based on the electric-device temperature is performed, and sets the total supply time as the predicted charging time (S170). Then, the predicted charging time deriving unit 74 performs the processing of step S300.

If the initial charging time is less than the total supply time (NO in S160), the predicted charging time deriving unit 74 determines that recharging based on the electric-device temperature is performed. Then, the predicted charging time deriving unit 74 performs processing of step S200 and the subsequent processing. The predicted charging time deriving unit 74 derives the recharging time, which is taken until the electric-device temperature reaches the first threshold from the second threshold, on the basis of the temperature difference between the first threshold and the second threshold, the allowed input current, the current outside air temperature, and the current electric-device temperature (S200).

Then, the predicted charging time deriving unit 74 derives the number of recharges on the basis of the total supply time, the initial charging time, and the recharging time (S210). For example, the predicted charging time deriving unit 74 subtracts the initial charging time from the total supply time and divides the resulting value by the recharging time to derive the number of recharges.

Then, the predicted charging time deriving unit 74 derives the pause time, which is taken until the electric-device temperature decreases from the first threshold to the second threshold, on the basis of the temperature difference between the first threshold and the second threshold, the current outside air temperature, and the current electric-device temperature (S220).

Then, the predicted charging time deriving unit 74 determines that the number of pauses is equal to the number of recharges, and multiplies the pause time by the number of recharges (the number of pauses) to derive the total pause time (S230).

Then, the predicted charging time deriving unit 74 adds the total pause time to the total supply time to derive the predicted charging time (S240). Then, the predicted charging time deriving unit 74 performs the processing of step S300. In this way, the predicted charging time that takes into account the pause time caused by the electric-device temperature is derived.

In step S300, the predicted charging time deriving unit 74 performs a correction process for correcting the predicted charging time (S300). Then, the series of processing operations ends. The correction process will be described below.

Figure 7:
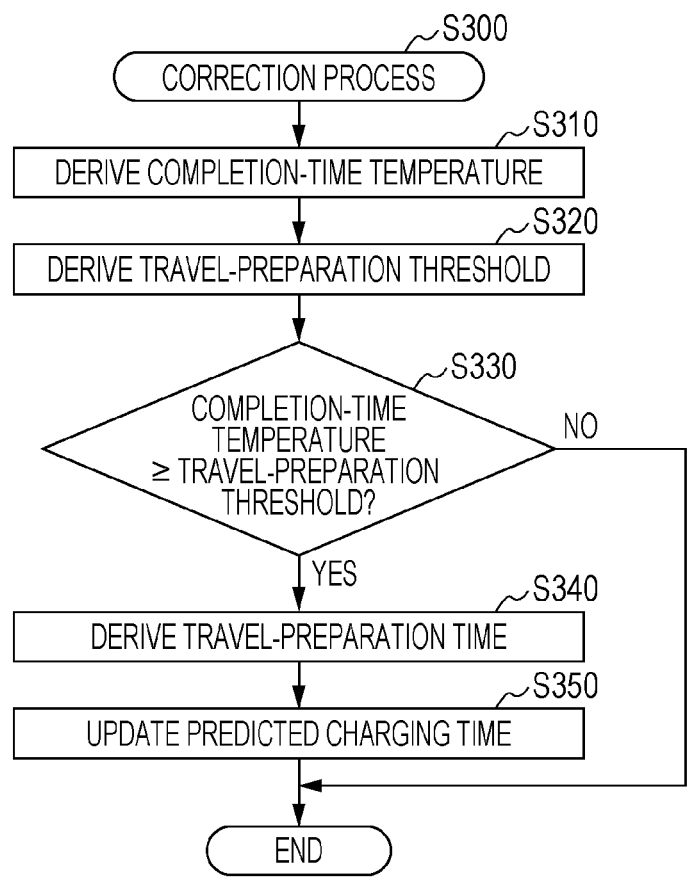
FIG. 7 is a flowchart illustrating a correction process.

FIG. 7 is a flowchart illustrating the correction process (S300). First, the predicted charging time deriving unit 74 derives the electric-device temperature at the charge completion time (completion-time temperature) (S310).

Then, the travel-preparation threshold deriving unit 76 derives the travel-preparation threshold on the basis of the amount of increase in the electric-device temperature in the previous travel cycle (S320). The travel-preparation threshold is not limited to a value less than the second threshold and may be greater than or equal to the second threshold.

Then, the predicted charging time deriving unit 74 determines whether the completion-time temperature is greater than or equal to the travel-preparation threshold (S330). If the completion-time temperature is less than the travel-preparation threshold (NO in S330), the predicted charging time deriving unit 74 terminates the series of processing operations. In this case, the predicted charging time is not corrected, and the predicted charging time derived in step S170 or S240 of the flowchart illustrated in FIG. 6 is maintained.

If the completion-time temperature is greater than or equal to the travel-preparation threshold (YES in S330), the predicted charging time deriving unit 74 derives the travel-preparation time on the basis of the temperature difference between the completion-time temperature and the travel-preparation threshold, the current outside air temperature, and the current electric-device temperature (S340).

Then, the predicted charging time deriving unit 74 adds the travel-preparation time and the predicted charging time derived in step S170 or S240 together to update (correct) the predicted charging time (S350). Then, the series of processing operations ends. As a result, the predicted charging time is extended by the travel-preparation time.

As described above, in the vehicle 10 according to this embodiment, during external charging, the supply of electric power to the battery 20 is paused when the electric-device temperature becomes greater than or equal to the first threshold, and the supply of electric power to the battery 20 is resumed when the electric-device temperature becomes less than the second threshold. In the vehicle 10 according to this embodiment, furthermore, in accordance with an instruction for external charging, the total supply time during which electric power is supplied to the battery 20 and the pause time of external charging are added together to derive the predicted charging time.

Accordingly, the vehicle 10 according to this embodiment can improve the prediction accuracy of the charging time.

In the vehicle 10 according to this embodiment, furthermore, if the completion-time temperature is predicted to be greater than or equal to the travel-preparation threshold, the travel-preparation time, which is a period of time from the charge completion time until the electric-device temperature becomes less than the travel-preparation threshold, is derived, and the predicted charging time is extended by the travel-preparation time.

As a result, even if the vehicle 10 according to this embodiment starts traveling immediately after the travel permission time, the time taken until the electric-device temperature reaches the first threshold can be delayed. Accordingly, the vehicle 10 according to this embodiment can prevent the electric-device temperature from reaching the first threshold before the battery temperature reaches the allowable upper limit. As a result, the vehicle 10 according to this embodiment can prevent the performance of the battery 20 from being limited due to the electric-device temperature without intention.

In the vehicle 10 according to this embodiment, furthermore, the travel-preparation threshold is derived on the basis of the amount of increase in the electric-device temperature in the previous travel cycle. Accordingly, the vehicle 10 according to this embodiment can prevent the electric-device temperature from reaching the first threshold during traveling, regardless of the driver.

While an embodiment of the disclosure has been described with reference to the accompanying drawings, it is to be understood that the disclosure is not limited to the embodiment. It is apparent that a person skilled in the art can make various changes or modifications within the scope as defined in the appended claims, and it is anticipated that such changes or modifications also fall within the technical scope of the disclosure.

For example, in the embodiment described above, the supply of electric power to the battery 20 is paused and resumed in accordance with the electric-device temperature, and the predicted charging time is extended by the travel-preparation time when the electric-device temperature at the time of completion of external charging is predicted to be greater than or equal to the travel-preparation threshold. However, the predicted charging time deriving unit 74 may extend the predicted charging time by the travel-preparation time, regardless of the state of external charging (paused and resumed), when the electric-device temperature at the time of completion of external charging is predicted to be greater than or equal to the travel-preparation threshold.

The vehicle controller 50 illustrated in FIG. 1 can be implemented by circuitry including at least one semiconductor integrated circuit such as at least one processor (e.g., a central processing unit (CPU)), at least one application specific integrated circuit (ASIC), and/or at least one field programmable gate array (FPGA). At least one processor can be configured, by reading instructions from at least one machine readable tangible medium, to perform all or a part of functions of the vehicle controller 50 including the electric-device temperature acquisition unit 70, the charging controller 72, the predicted charging time deriving unit 74, and the travel-preparation threshold deriving unit 76. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the non-volatile memory may include a ROM and a NVRAM. The ASIC is an integrated circuit (IC) customized to perform, and the FPGA is an integrated circuit designed to be configured after manufacturing in order to perform, all or a part of the functions of the modules illustrated in FIG. 1.

The invention claimed is:

1. A vehicle comprising:
an electric-device temperature acquisition unit configured to acquire a temperature of an electric device disposed in a current path for external charging for supplying electric power from a power supply external to the vehicle to a battery mounted in the vehicle;
a charging controller configured to
   pause a supply of electric power to the battery in response to the temperature of the electric device becoming greater than or equal to a first threshold during the external charging, and
   resume the supply of electric power to the battery in response to the temperature of the electric device becoming less than a second threshold lower than the first threshold; and
a predicted charging time deriving unit configured to derive a predicted charging time that is a time predicted to be taken for the external charging in accordance with an instruction for the external charging, the predicted charging time being a sum of a total supply time and a pause time, the total supply time being a total time during which electric power is supplied to the battery, the pause time being a period of time from when the supply of electric power to the battery is paused to when the supply of electric power to the battery is resumed.

2. The vehicle according to claim 1, wherein when an expected temperature of the electric device at a time of completion of the external charging is predicted to be greater than or equal to a travel-preparation threshold, the predicted charging time deriving unit derives a travel-preparation time and extends the predicted charging time by the travel-preparation time, the travel-preparation time being a period of time from the time of completion of the external charging until the temperature of the electric device becomes less than the travel-preparation threshold.

3. The vehicle according to claim 2, further comprising a travel-preparation threshold deriving unit configured to derive the travel-preparation threshold on a basis of an amount of increase in the temperature of the electric device in a previous travel cycle.

4. A vehicle comprising:
circuitry configured to
   acquire a temperature of an electric device disposed in a current path for external charging for supplying electric power from a power supply external to the vehicle to a battery mounted in the vehicle,
   pause a supply of electric power to the battery in response to the temperature of the electric device becoming greater than or equal to a first threshold during the external charging,
   resume the supply of electric power to the battery in response to the temperature of the electric device becoming less than a second threshold lower than the first threshold, and
   derive a predicted charging time that is a time predicted to be taken for the external charging in accordance with an instruction for the external charging, the predicted charging time being a sum of a total supply time and a pause time, the total supply time being a total time during which electric power is supplied to the battery, the pause time being a period of time from when the supply of electric power to the battery is paused to when the supply of electric power to the battery is resumed.

\* \* \* \* \*